(12) United States Patent
Nishiyama

(10) Patent No.: US 11,960,076 B2
(45) Date of Patent: *Apr. 16, 2024

(54) VIBRATING DEVICE AND VIBRATION CONTROL METHOD

(71) Applicant: Murata Manufacturing Co., Ltd., Nagaokakyo (JP)

(72) Inventor: Kenji Nishiyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 375 days.

This patent is subject to a terminal disclaimer.

(21) Appl. No.: 17/320,285

(22) Filed: May 14, 2021

(65) Prior Publication Data

US 2021/0294095 A1 Sep. 23, 2021

Related U.S. Application Data

(63) Continuation of application No. PCT/JP2020/040891, filed on Oct. 30, 2020.

(30) Foreign Application Priority Data

Mar. 19, 2020 (JP) .................................. 2020-049774

(51) Int. Cl.
*G02B 27/00* (2006.01)
*B06B 1/02* (2006.01)
(Continued)

(52) U.S. Cl.
CPC ........ *G02B 27/0006* (2013.01); *B06B 1/0207* (2013.01); *B06B 1/0651* (2013.01);
(Continued)

(58) Field of Classification Search
CPC ................... G02B 27/0006; H10N 30/00–886
See application file for complete search history.

(56) References Cited

U.S. PATENT DOCUMENTS

| 4,999,536 A | * | 3/1991 | Toda | ........................ | H02N 2/103 |
| | | | | | 310/369 |
| 2009/0002541 A1 | * | 1/2009 | Niwamae | ............... | G03B 17/02 |
| | | | | | 348/335 |

(Continued)

FOREIGN PATENT DOCUMENTS

| CN | 101334577 A | 12/2008 |
| CN | 110546941 A | 12/2019 |

(Continued)

OTHER PUBLICATIONS

International Search Report in PCT/JP2020/040891, dated Dec. 15, 2020, 3 pages.

(Continued)

*Primary Examiner* — Michael E Barr
*Assistant Examiner* — Omair Chaudhri
(74) *Attorney, Agent, or Firm* — Keating & Bennett, LLP

(57) ABSTRACT

A vibrating device includes a translucent cover, an ejector to eject a liquid onto the surface of the translucent cover, and a first vibrating portion to vibrate the translucent cover at a vibration acceleration of larger than about $8.0 \times 10^5$ m/s$^2$ and equal to or smaller than about $21.0 \times 10^5$ m/s$^2$.

14 Claims, 14 Drawing Sheets

(51) Int. Cl.
   *B06B 1/06*          (2006.01)
   *B60S 1/52*          (2006.01)
   *B60S 1/56*          (2006.01)
   *G02B 1/18*          (2015.01)

(52) U.S. Cl.
   CPC ............ *G02B 1/18* (2015.01); *B06B 2201/77* (2013.01); *B60S 1/52* (2013.01); *B60S 1/56* (2013.01)

(56) References Cited

U.S. PATENT DOCUMENTS

| | | | |
|---|---|---|---|
| 2011/0073142 A1 | 3/2011 | Hattori et al. | |
| 2012/0243093 A1* | 9/2012 | Tonar | H10N 30/20 359/507 |
| 2013/0221200 A1* | 8/2013 | Watanabe | G02B 27/0006 250/208.1 |
| 2014/0085694 A1* | 3/2014 | Aga | H10N 30/877 310/366 |
| 2014/0218588 A1* | 8/2014 | Ifuku | H10N 30/85 348/340 |
| 2017/0361360 A1* | 12/2017 | Li | G02B 27/0006 |
| 2018/0210194 A1* | 7/2018 | Nishiyama | H04N 23/52 |
| 2019/0263124 A1 | 8/2019 | Takahashi et al. | |
| 2020/0039475 A1 | 2/2020 | Ichiguchi et al. | |
| 2020/0057301 A1 | 2/2020 | Kuratani et al. | |
| 2020/0346255 A1* | 11/2020 | Robertson, Jr. | B60S 1/56 |

FOREIGN PATENT DOCUMENTS

| | | | | |
|---|---|---|---|---|
| CN | 110574358 A | | 12/2019 | |
| CN | 110730693 A | | 1/2020 | |
| EP | 3618415 A1 | | 3/2020 | |
| EP | 3618416 A1 | | 3/2020 | |
| JP | 2008003165 A | * | 1/2008 | |
| JP | 2008003165 A | | 1/2008 | |
| JP | 2009010736 A | | 1/2009 | |
| JP | 2011244417 A | | 12/2011 | |
| JP | 2019147350 A | | 9/2019 | |
| WO | 2018198464 A1 | | 11/2018 | |
| WO | 2018198465 A1 | | 11/2018 | |
| WO | WO-2018198465 A1 | * | 11/2018 | ............... B08B 7/02 |
| WO | WO-2020003571 A1 | * | 1/2020 | ............ B06B 1/0207 |

OTHER PUBLICATIONS

Written Opinion in PCT/JP2020/040891, dated Dec. 15, 2020, 4 pages.
Office Action in CN202080015259.7, dated Dec. 20, 2023, 9 pages.

\* cited by examiner

VIBRATING DEVICE AND VIBRATION CONTROL METHOD

CROSS REFERENCE TO RELATED APPLICATIONS

This application claims the benefit of priority to Japanese Patent Application No. 2020-049774 filed on Mar. 19, 2020 and is a Continuation Application of PCT Application No. PCT/JP2020/040891 filed on Oct. 30, 2020. The entire contents of each application are hereby incorporated herein by reference.

BACKGROUND OF THE INVENTION

1. Field of the Invention

The present invention relates to a vibrating device and a vibration control method.

2. Description of the Related Art

A camera for outside use, such as an onboard camera or a surveillance camera, includes a translucent cover covering a lens to prevent adhesion of foreign matter, such as oil or mud, to the lens. Adhesion of foreign matter to the translucent cover may obstruct the view of the camera.

To address this, as in an onboard optical sensor cover described in Japanese Unexamined Patent Application Publication No. 2011-244417, a structure that sprays a cleaning liquid on a cover glass to remove foreign matter adhering to the cover glass has been studied.

The onboard optical sensor cover described in Japanese Unexamined Patent Application Publication No. 2011-244417 still has room for improvement in cleaning performance.

SUMMARY OF THE INVENTION

Preferred embodiments of the present invention provide vibrating devices and vibration control methods that each improve cleaning performance.

A vibrating device according to a preferred embodiment of the present invention includes a translucent cover, an ejector to eject a liquid onto a surface of the translucent cover, and a first vibrating portion to vibrate the translucent cover at a vibration acceleration of larger than about $8.0 \times 10^5$ m/s$^2$ and equal to or smaller than about $21.0 \times 10^5$ m/s$^2$.

A vibration control method according to a preferred embodiment of the present invention is performed with a vibrating device including a translucent cover, an ejector to eject a liquid onto a surface of the translucent cover, and a first vibrating portion to vibrate the translucent cover. The method includes ejecting a liquid onto the surface of the translucent cover with the ejector, and vibrating the translucent cover with the first vibrating portion at a vibration acceleration of larger than about $8.0 \times 10^5$ m/s$^2$ and equal to or smaller than about $21.0 \times 10^5$ m/s$^2$.

Preferred embodiments of the present invention provide vibrating devices and vibration control methods that are each capable of improving cleaning performance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
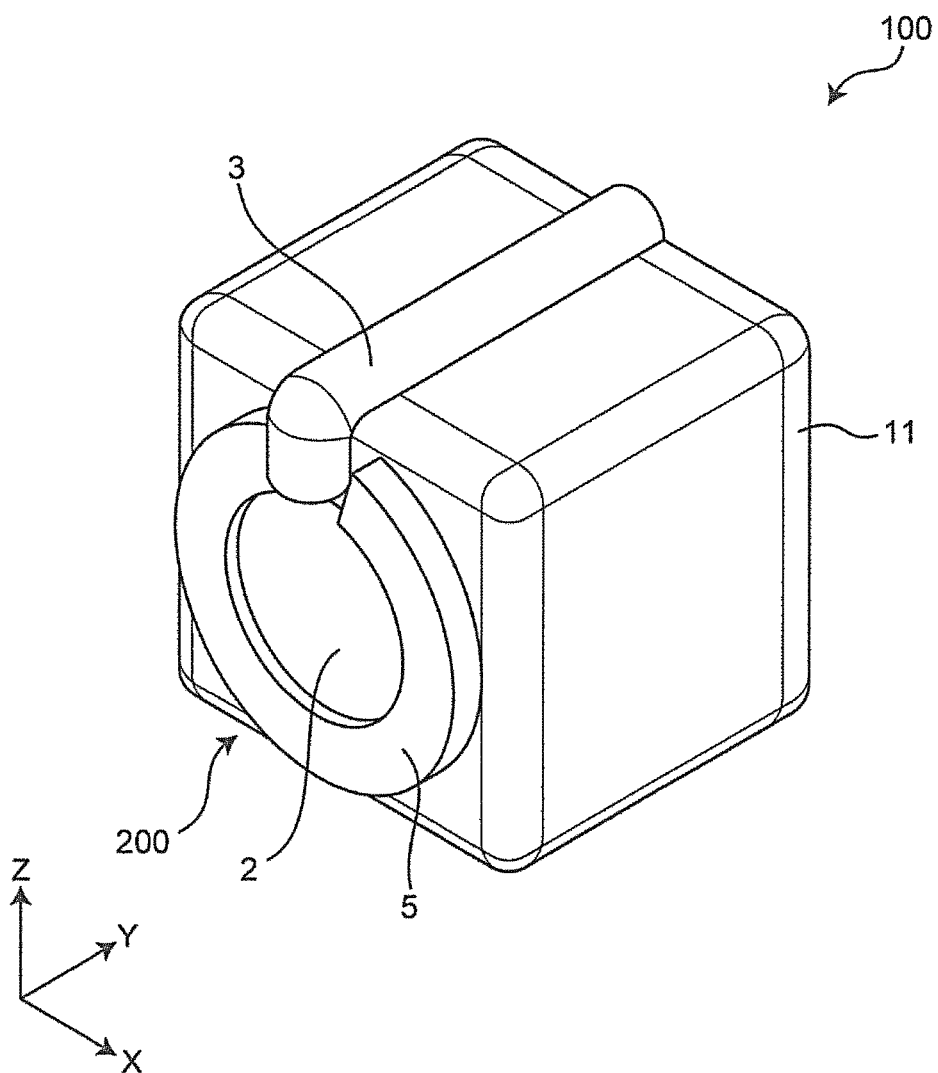
FIG. 1 is a schematic perspective view of a vibrating device according to Preferred Embodiment 1 of the present invention installed in an image pickup unit.

Underlying Knowledge Forming Basis of the Present Invention

Cameras for outdoor use, such as an onboard camera, a surveillance camera, and a camera, for example, installed in a drone are exposed to the weather, and thus include a cover made of glass or transparent plastic to cover the lens. However, when foreign matter, such as mud or oil, for example, adheres to the cover of a camera, the camera captures an image containing the foreign matter, and may have its field of view obstructed and fail to acquire a clear image.

To address this, as in the case of the onboard optical sensor cover described in Japanese Unexamined Patent Application Publication No. 2011-244417, a system that includes a cleaning nozzle that sprays a cleaning liquid on a cover to clean the cover when foreign matter adheres to the cover has been studied.

In the structure of Japanese Unexamined Patent Application Publication No. 2011-244417, however, the sprayed cleaning liquid flows down, and thus fails to fully provide its cleaning performance. To address this, the inventor of preferred embodiments of the present invention has studied a structure to efficiently clean the cover by retaining the cleaning liquid on the cover, and has developed preferred embodiments of the present invention, as described below.

A vibrating device according to a preferred embodiment of the present invention includes a translucent cover, an ejector to eject a liquid onto a surface of the translucent cover, and a first vibrating portion to vibrate the translucent cover at a vibration acceleration of larger than about $8.0 \times 10^5$ m/s$^2$ and equal to or smaller than about $21.0 \times 10^5$ m/s$^2$.

This structure can improve the cleaning performance.

The vibrating device may also include a controller to control the first vibrating portion and the ejector.

This structure can control vibrations of the first vibrating portion and ejection of a liquid from the ejector.

The first vibrating portion may include a piezoelectric device, and the controller may control the vibration acceleration by controlling the voltage applied to the piezoelectric device to be higher than about 15 Vp-p and equal to or lower than about 40 Vp-p, for example.

This structure can easily control the vibration acceleration by changing the voltage applied to the piezoelectric device.

The structure may also include one or more second vibrating portions controlled by the controller and positioned around the translucent cover.

This structure can further improve cleaning efficiency by providing vibrations to the liquid sprayed on the translucent cover.

The one or more second vibrating portions may have an annular shape.

This structure can uniformly provide vibrations to the liquid sprayed on the translucent cover, and thus can further improve the cleaning efficiency.

The second vibrating portions may be equidistantly positioned around the translucent cover.

This structure can uniformly provide vibrations to the liquid sprayed on the translucent cover, and thus can further improve the cleaning efficiency.

A water-repellent coating layer may be provided on the surface of the translucent cover.

This structure can prevent adhesion of foreign matter, and improve the cleaning efficiency of the one or more second vibrating portions.

The water-repellent coating layer may include multiple protrusions on the surface of the translucent cover.

This structure can improve the cleaning efficiency to remove foreign matter adhering to gaps between the multiple protrusions.

A vibration control method according to a preferred embodiment of the present invention is performed with a vibrating device that includes a translucent cover, an ejector to eject a liquid onto a surface of the translucent cover, and a first vibrating portion to vibrate the translucent cover. The method includes ejecting a liquid onto the surface of the translucent cover with the ejector, and vibrating the translucent cover with the first vibrating portion at a vibration acceleration of larger than about $8.0 \times 10^5$ m/s$^2$ and equal to or smaller than about $21.0 \times 10^5$ m/s$^2$.

This structure can improve cleaning performance.

The vibration step may control the vibration acceleration by changing a voltage applied to the first vibrating portion.

This structure can control vibrations of the first vibrating portion and ejection of a liquid from the ejector.

The vibrating device may further include one or more second vibrating portions positioned around the translucent cover, and the method may further include a cleaning step of cleaning the translucent cover by providing vibrations to the liquid using the one or more second vibrating portions.

This structure can further improve cleaning efficiency by providing vibrations to the liquid sprayed on the translucent cover.

Preferred Embodiment 1 according to the present invention will be described below with reference to the drawings. Throughout the drawings, each component is not necessarily shown to scale for easy understanding.

Preferred Embodiment 1

A vibrating device according to Preferred Embodiment 1 of the present invention is included in an onboard image pickup unit. In Preferred Embodiment 1, a vibrating device included in an image pickup unit will be described by way of example.

Figure 2:
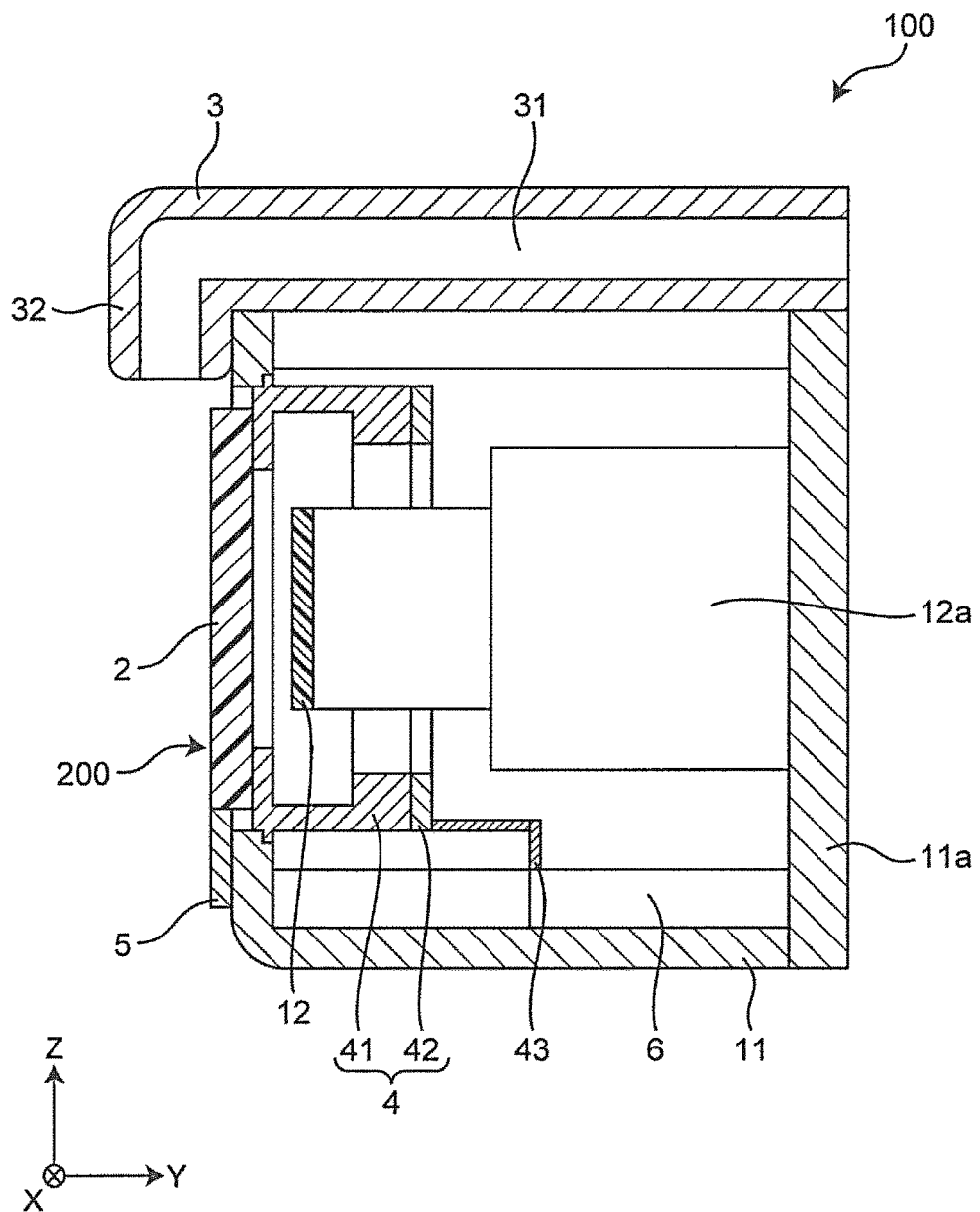
FIG. 2 is a schematic cross-sectional view of the image pickup unit illustrated in FIG. 1.
Figure 3:
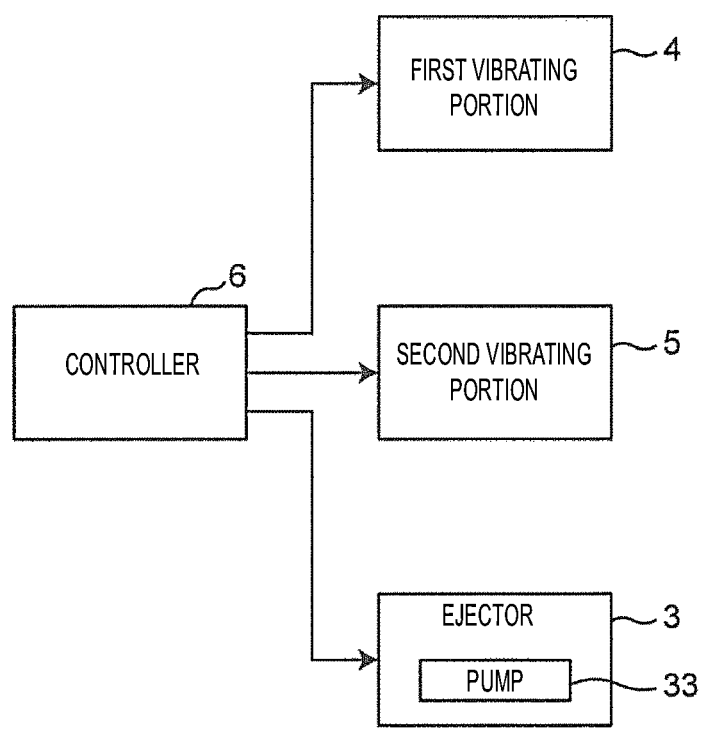
FIG. 3 is a block diagram of a structure of the vibrating device illustrated in FIG. 1.

FIG. 1 is a schematic perspective view of a vibrating device 200 according to Preferred Embodiment 1 of the present invention installed in an image pickup unit 100. FIG. 2 is a cross-sectional view of the image pickup unit 100 illustrated in FIG. 1. FIG. 3 is a block diagram of a structure of the vibrating device 200 illustrated in FIG. 1.

Image Pick-Up Unit

As illustrated in FIGS. 1 and 2, the image pickup unit 100 includes a housing 11, an image pickup portion 12, and the vibrating device 200. X, Y, and Z directions in the drawings respectively indicate the width direction, the thickness direction, and the height direction of the image pickup unit 100.

The housing 11 accommodates the vibrating device 200 and the image pickup portion 12. For example, the housing 11 has a tubular shape, and is made of, for example, metal or synthetic resin. As illustrated in FIG. 1, the housing 11 according to the present preferred embodiment has an angular tube shape, but may have another shape, such as a cylindrical shape, for example. A base plate 11a is fixed to a first end of the housing 11, and a translucent cover 2 of the vibrating device 200 is exposed to the outside at a second end of the housing 11.

As illustrated in FIG. 2, the image pickup portion 12 is fixed to a base plate 11a, which is supported by a body member 12a and fixed to the housing 11. The image pickup portion 12 includes a circuit (not illustrated) including an image pickup device. Examples of the image pickup device include a complementary metal oxide semiconductor (CMOS), a charge-coupled device (CCD), a bolometer, and a thermopile that receive light of a wavelength within a range from a visible region to a far-infrared region. A lens unit including multiple lenses (not illustrated) may be fixed in the image pickup portion 12 in an image pickup direction of the image pickup portion 12. The structure of the image pickup portion 12 is not limited to a particular one, and may be any structure that can capture images of an image-pickup target located in front of the lenses.

The vibrating device 200 includes a translucent cover 2, an ejector 3, a first vibrating portion 4, a second vibrating portion 5, and a controller 6 (refer to FIG. 3). The vibrating device 200 cleans the translucent cover 2 by spraying a liquid on the translucent cover 2 and providing vibrations to the translucent cover 2. The liquid is, for example, a cleaning liquid and facilitates removal of dirt such as, mud or oil, for example, adhering to the translucent cover 2. In the present preferred embodiment, the vibrating device 200 can spray a liquid (cleaning liquid) on the translucent cover 2, vibrate the translucent cover 2 with the first vibrating portion 4 at a predetermined vibration acceleration, and hold the liquid on the surface of the translucent cover 2. The second vibrating portion 5 can provide vibrations to the liquid held on the surface of the translucent cover 2, and clean the surface of the translucent cover 2 by ultrasonic cleaning. The second vibrating portion 5 and the controller 6 are optional, and may be omitted from the vibrating device 200.

Vibrating Device

Components included in the vibrating device 200 will be described in detail below.

Translucent Cover

The translucent cover 2 has translucency to allow light or energy of a wavelength detected by an optical detector in the image pickup portion 12, such as an image pickup device, for example, to pass therethrough. The translucent cover 2 protects the image pickup portion 12 against adhesion of foreign matter. The image pickup portion 12 is disposed on the inner side of the translucent cover 2, and captures images of an image-pickup target outside of the image pickup unit 100 through the translucent cover 2.

Examples that can be used as a material for the translucent cover 2 include translucent plastics, glass such as quartz or borosilicate glass, translucent ceramics, and synthetic resin. The translucent cover 2 made of, for example, reinforced glass can improve the strength of the translucent cover 2.

The translucent cover 2 has a disc shape, for example. Specifically, when viewed in a thickness direction (Y direction) of the vibrating device 200, the translucent cover 2 is circular or substantially circular. The translucent cover 2 may have any shape other than a disc shape. For example, when viewed in the thickness direction of the vibrating device 200, the translucent cover 2 may have, for example, a polygonal, oval, or triangular shape.

In the present preferred embodiment, the translucent cover 2 preferably has a disc shape with a diameter of about 20 mm and a thickness of about 2 mm, for example. The translucent cover 2 is made of glass with translucency.

The translucent cover 2 is joined to the first vibrating portion 4 at its outer circumferential edge. The translucent cover 2 and the first vibrating portion 4 can be joined by, for example, a binder or brazing filler metal. Instead, they can be joined by, for example, thermocompression bonding or anode connection.

First Vibrating Portion

The first vibrating portion 4 vibrates the translucent cover 2. The first vibrating portion 4 vibrates the translucent cover 2 in the thickness direction of the vibrating device 200. The first vibrating portion 4 vibrates the translucent cover 2 at a predetermined vibration acceleration. The predetermined vibration acceleration is preferably larger than about $8.0 \times 10^5$ m/s$^2$ and equal to or smaller than about $21.0 \times 10^5$ m/s$^2$, for example. More preferably, the predetermined vibration acceleration is larger than or equal to about $10.0 \times 10^5$ m/s$^2$ and equal to or smaller than about $17.0 \times 10^5$ m/s$^2$, for example. When the translucent cover 2 vibrates at the predetermined vibration acceleration, the liquid ejected from the ejector 3, described below, can be held on the translucent cover 2. Specifically, when the translucent cover 2 vibrates at a vibration acceleration within the above range, the liquid ejected on the translucent cover 2 can be retained in a film on the surface of the translucent cover 2.

The first vibrating portion 4 has a cylindrical shape. In the present preferred embodiment, the first vibrating portion 4 preferably has a cylindrical shape with an inner diameter of about 16 mm, an outer diameter of about 20 mm, and a height of about 11 mm, for example. The first vibrating portion 4 may have a cylindrical shape with, for example, an inner diameter of larger than or equal to about 6 mm and smaller than or equal to about 36 mm, an outer diameter of larger than or equal to about 10 mm and smaller than or equal to about 40 mm, and a height of larger than or equal to about 6 mm and smaller than or equal to about 40 mm.

As illustrated in FIG. 2, the first vibrating portion 4 includes a vibrator 41 and a piezoelectric device 42.

The vibrator 41 is disposed between the piezoelectric device 42 and the translucent cover 2. The vibrator 41 is joined to the piezoelectric device 42 and the translucent cover 2 with, for example, a binder. The vibrator 41 amplifies vibrations of the piezoelectric device 42 and transmits the vibrations to the translucent cover 2.

The vibrator 41 is made of, for example, metal. Examples usable as a material of the vibrator 41 include stainless steel, 42 alloy, 50 alloy, Invar, Super-Invar, Kovar, aluminum, and duralumin. The vibrator 41 may be made of, for example, ceramics such as alumina and zirconia. The vibrator 41 may be made of a semiconductor, such as Si, for example. The vibrator 41 may be covered with an insulating material.

In the present preferred embodiment, the vibrator 41 preferably has a cylindrical shape with an inner diameter of about 16 mm, an outer diameter of about 20 mm, and a height of about 11 mm. The vibrator 41 is preferably made of stainless steel (SUS 303), for example.

The piezoelectric device 42 vibrates the translucent cover 2 with the vibrator 41 interposed therebetween. The piezoelectric device 42 is connected to a power-feeding conductor 43. The piezoelectric device 42 vibrates upon receiving power from the power-feeding conductor 43. In other words, the piezoelectric device 42 vibrates in response to an application of a voltage from the power-feeding conductor 43.

The piezoelectric device 42 includes a piezoelectric member, and an electrode connected to the power-feeding conductor 43. Examples usable as a material of the piezoelectric member include piezoelectric ceramics such as barium titanate ($BaTiO_3$), lead zirconate titanate (PZT, or $PbTiO_3$—$PbZrO_3$), lead titanate ($PbTiO_3$), lead metaniobate ($PbNb_2O_6$), bismuth titanate ($Bi_4Ti_3O_{12}$), and (K, Na)$NbO_3$, and piezoelectric single crystals such as $LiTaO_3$ and $LiNbO_3$. The electrode may be, for example, a Ni electrode. The electrode may be made of, for example, a thin metal film made of Ag or Au by sputtering. Instead of sputtering, the electrode can be formed by plating or vapor deposition.

In the present preferred embodiment, the piezoelectric device 42 preferably has an annular plate shape with an inner diameter of about 16 mm, an outer diameter of about 20 mm, and a thickness of about 1 mm, for example. The annular plate shape indicates a shape of an annular plate. The piezoelectric member of the piezoelectric device 42 is preferably made of, for example, lead zirconate titanate (PZT, or Pb(Zr—Ti)$O_3$).

The power-feeding conductor 43 connects the controller 6 and the piezoelectric device 42 to each other. The power-feeding conductor 43 is connected to a feeder circuit included in the controller 6 to feed power from the feeder circuit to the piezoelectric device 42.

The power-feeding conductor 43 is made of a conductive material. Examples of the material of the power-feeding conductor 43 include stainless steel, beryllium copper, nickel silver, and copper.

Ejector

The ejector 3 ejects a liquid onto the surface of the translucent cover 2. As illustrated in FIG. 2, the ejector 3 is disposed on the upper surface of the housing 11. The ejector 3 includes a pipe 31, an ejection head 32 disposed at the far end of the pipe 31, and a pump 33 (refer to FIG. 3) that feeds a liquid to the pipe 31. In the present preferred embodiment, the liquid is ejected downward in the vertical direction (Z direction) from the ejection head 32 of the ejector 3.

Examples usable as the liquid ejected from the ejector 3 include a cleaning liquid and a coating material. The pipe 31 and the ejection head 32 are disposed outside of the image-pickup range (field of vision) of the image pickup portion 12 at positions where the pipe 31 and the ejection head 32 are not included in images captured by the image pickup portion 12.

When, for example, oil or dirt containing a solid component, such as mud, adheres to the translucent cover 2, a cleaning liquid is ejected from the ejector 3 to facilitate removal of the solid component, oil, or other materials adhering to the translucent cover 2. In the present preferred embodiment, vibrations of the first vibrating portion 4 cause the translucent cover 2 to vibrate at a vibration acceleration of larger than about $8.0 \times 10^5$ m/s$^2$ and equal to or smaller than about $21.0 \times 10^5$ m/s$^2$, for example. When the translucent cover 2 vibrates at a vibration acceleration within this range, the liquid can be retained on the surface of the translucent cover 2.

Second Vibrating Portion

The second vibrating portion 5 is positioned around the translucent cover 2. In the present preferred embodiment, the second vibrating portion 5 has a partially discontinuous annular shape, as illustrated in FIG. 1. The second vibrating portion is disposed outside of the image-pickup range (field of vision) of the image pickup portion 12, at a position where the second vibrating portion 5 is not included in images captured by the image pickup portion 12 and where the second vibrating portion 5 is maintained in contact with the liquid retained on the surface of the translucent cover 2. The second vibrating portion 5 can vibrate the liquid retained on the surface of the translucent cover 2, and clean the surface of the translucent cover 2.

In the present preferred embodiment, an annular piezoelectric member with an inner diameter of about 21 mm, an outer diameter of about 25 mm, and a thickness of about 1 mm is used as an example of the second vibrating portion 5.

Examples usable as a piezoelectric member include lead-zirconate-titanate piezoelectric ceramics. Alternatively, other piezoelectric ceramics, such as (K, Na)NbO$_3$ may be used as an example of the piezoelectric member. Alternatively, piezoelectric single crystals such as LiTaO$_3$ may be used as an example of the piezoelectric member. To improve the reliability of the second vibrating portion 5, the second vibrating portion 5 may be covered with a reliable member such as glass, alumina, Teflon (registered trademark), or stainless steel (SUS303), for example.

The second vibrating portion 5 is connected to a power-feeding conductor, not illustrated. The second vibrating portion 5 vibrates upon receiving power from the power-feeding conductor. Specifically, the second vibrating portion 5 vibrates in response to an application of a voltage from the power-feeding conductor.

The second vibrating portion 5 can vibrate the liquid held on the surface of the translucent cover 2 at a low frequency (several tens kHz) or at a high frequency (several MHz) in accordance with the condition of the dirt on the translucent cover 2. The second vibrating portion 5 vibrates the liquid held on the surface of the translucent cover 2, so that the dirt on the surface of the translucent cover 2 can be removed by ultrasonic cleaning.

When the frequency of vibrations from the second vibrating portion 5 is high, that is, when the second vibrating portion 5 vibrates the liquid on the surface of the translucent cover 2 at a high frequency, the translucent cover 2 can be cleaned while receiving little or no damage. On the other hand, when the frequency of vibrations from the second vibrating portion 5 is low, that is, when the second vibrating portion 5 vibrates the liquid on the surface of the translucent cover 2 at a low frequency, the translucent cover 2 can be cleaned with high cleaning performance in a shorter time. Thus, the second vibrating portion 5 may change the frequency of vibrations for different purposes, for example, providing vibrations at a low frequency that has high cleaning performance for highly viscous dirt (such as mud or oil), or vibrations at a high frequency for reducing damages on the translucent cover 2.

Controller

As illustrated in FIG. 3, the controller 6 is configured or programmed to control the first vibrating portion 4, the ejector 3, and the second vibrating portion 5.

The controller 6 is connected to the piezoelectric device 42 of the first vibrating portion 4 via the power-feeding conductor 43. The controller 6 feeds power to the piezoelectric device 42 through the power-feeding conductor 43. Specifically, the controller 6 applies a voltage to the piezoelectric device 42 through the power-feeding conductor 43. Thus, the controller 6 controls vibrations of the first vibrating portion 4.

For example, in response to detection of dirt on the translucent cover 2, the controller 6 may apply a voltage to the piezoelectric device 42 through the power-feeding conductor 43. The dirt on the translucent cover 2 can be detected by, for example, distortion of images captured by the image pickup portion 12. An application of a voltage on the piezoelectric device 42 can be finished with, for example, an elapse of a predetermined time from the start of the voltage application.

In the present preferred embodiment, the controller 6 controls the voltage applied to the piezoelectric device 42 to be larger than about 15 Vp-p and smaller than or equal to about 40 Vp-p. Thus, the controller 6 controls the level of vibrations of the first vibrating portion 4 to control the vibration acceleration of the translucent cover 2 to be larger than about $8.0 \times 10^5$ m/s$^2$ and equal to or smaller than about $21.0 \times 10^5$ m/s$^2$, for example.

The controller 6 controls the ejector 3 to control ejection of a liquid from the ejector 3. For example, upon detecting dirt on the translucent cover 2, the controller 6 controls the ejector 3 to eject a liquid, such as a cleaning liquid. Ejection of a liquid from the ejector 3 can be finished in response to, for example, ejection of a predetermined amount of the liquid.

The controller 6 is connected to the second vibrating portion 5 with a power-feeding conductor not illustrated. The controller 6 feeds power to the second vibrating portion 5 through the power-feeding conductor. Specifically, the controller 6 applies a voltage to the second vibrating portion 5 through the power-feeding conductor. When the controller 6 controls the second vibrating portion 5 to vibrate, the liquid retained on the surface of the translucent cover 2 vibrates.

The controller 6 starts an application of a voltage to the second vibrating portion 5 in response to, for example, the start of ejection of the liquid from the ejector 3. The controller 6 may finish the application of the voltage to the second vibrating portion 5 in response to, for example, finishing the application of the voltage to the piezoelectric device 42 of the first vibrating portion 4.

The controller 6 is, for example, a central processing unit (CPU) defining and functioning as a control center. The controller 6 includes a read only memory (ROM), which stores, for example, programs or control data for operating the CPU, a random access memory (RAM), which defines and functions as a work area for the CPU, and an input-output interface to maintain signal integrity with peripheral devices.

Operations

Figure 4:
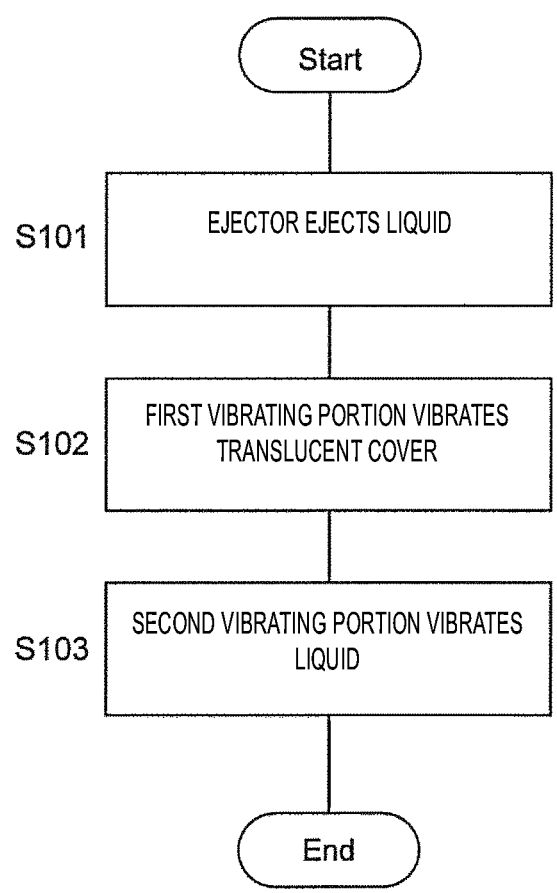
FIG. 4 is a flowchart of a vibration control method for a vibrating device according to a preferred embodiment of the present invention.

With reference to FIG. 4, a non-limiting example of a vibration control method performed by the vibrating device 200 will be described. FIG. 4 is a flowchart illustrating the vibration control method performed by the vibrating device 200.

The vibrating device 200 executes a cleaning operation when, for example, an image captured by the image pickup portion 12 is processed, and the translucent cover 2 is determined to have dirt thereon. For example, when dirt adheres to the surface of the translucent cover 2, an image captured by the image pickup portion 12 is distorted or has other defects. Such distortion or other defects of the image is automatically detected by the controller 6, and the translucent cover 2 is determined to have dirt thereon. Thus, the vibrating device 200 starts the cleaning operation.

When the translucent cover 2 receives dirt thereon, the ejector 3 ejects a liquid (cleaning liquid) on the surface of the translucent cover 2 (step S101). Subsequently, the controller 6 applies an alternating-current (AC) voltage to the first vibrating portion 4 to drive the piezoelectric device 42. In response to driving of the piezoelectric device 42, the first vibrating portion 4 vibrates. In response to the vibration of the first vibrating portion 4, the translucent cover 2 vibrates. Specifically, the first vibrating portion 4 vibrates the translucent cover (step S102).

The first vibrating portion 4 is excited by a longitudinal effect or a transversal effect. The longitudinal effect refers to an occurrence of stress in a direction parallel or substantially parallel to the direction of the electric field, and the transversal effect refers to an occurrence of stress in a direction perpendicular or substantially perpendicular to the direction of the electric field. In the present preferred embodiment, a breathing vibration mode caused by the transversal effect of the first vibrating portion 4 is converted into a bending vibration mode by the vibrator 41 to vibrate the translucent cover 2 in the bending vibration mode. The breathing vibration mode is a mode where the ring-shaped piezoelectric device 42 naturally vibrates in the radial direction, and the bending vibration mode is a mode where the piezoelectric device 42 naturally vibrates in the thickness direction of the piezoelectric device 42.

When the translucent cover 2 is caused to vibrate with the vibrations of the first vibrating portion 4 at a vibration acceleration of larger than about $8.0 \times 10^5$ m/s$^2$ and equal to or smaller than about $21.0 \times 10^5$ m/s$^2$, the liquid ejected onto the surface of the translucent cover 2 can be retained on the surface of the translucent cover 2. This will be described with reference to the graph in FIG. 5.

Figure 5:
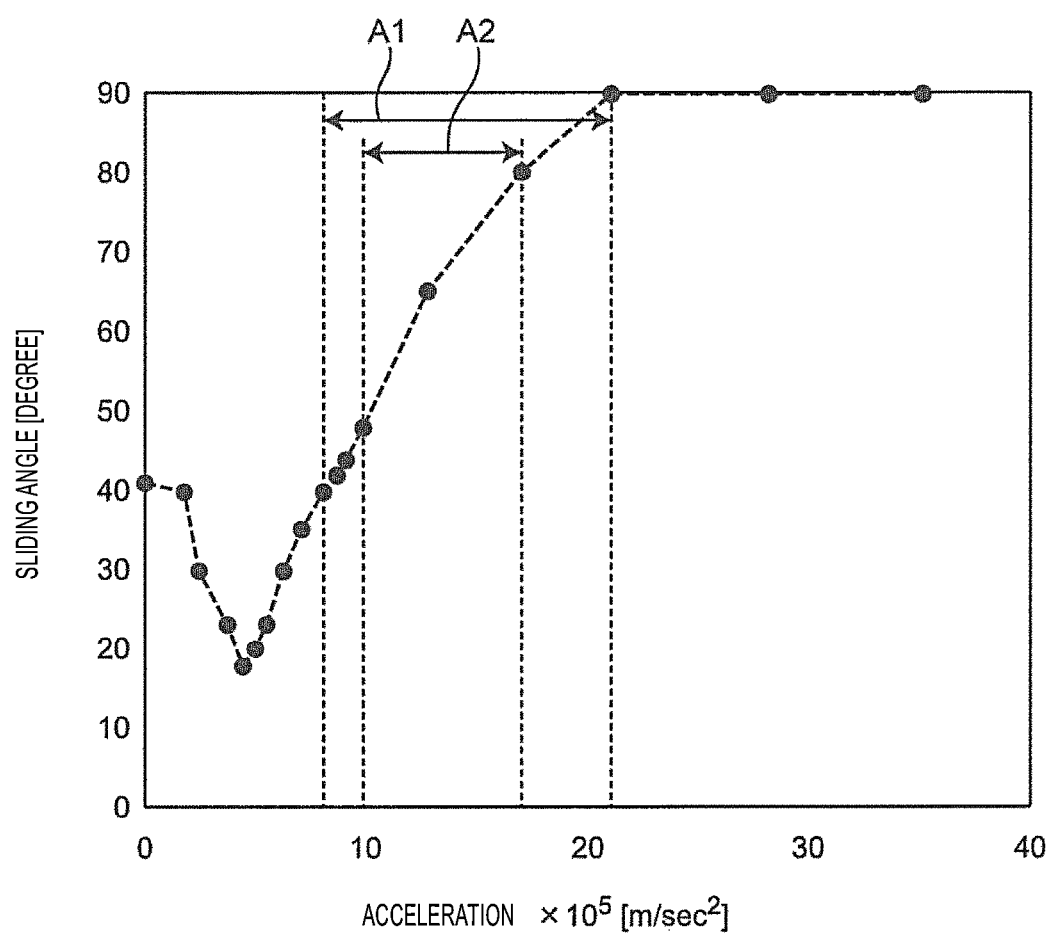
FIG. 5 is a graph showing the relationship between the vibration acceleration and the sliding angle of a translucent cover in the vibrating device illustrated in FIG. 1.

FIG. 5 is a graph showing the relationship between a sliding angle and the vibration acceleration of the translucent cover 2 in the vibrating device 200 illustrated in FIG. 1. The sliding angle is an angle between the horizontal plane and the solid surface when a liquid that has adhered to a horizontal solid surface starts sliding downward after the solid surface is gradually inclined from the horizontal surface. Generally, a liquid is less likely to adhere to a solid surface having a smaller sliding angle.

As shown in the graph in FIG. 5, the sliding angle is approximately 40 degrees when the translucent cover 2 is not vibrating (at an acceleration of 0), for example. When the vibration acceleration of the translucent cover 2 exceeds about $8.0 \times 10^5$ m/s$^2$, the sliding angle exceeds approximately 40 degrees, for example. Specifically, when the vibration acceleration of the translucent cover 2 exceeds about $8.0 \times 10^5$ m/s$^2$, the liquid on the surface of the translucent cover 2 is less likely to fall than when the translucent cover 2 remains stationary.

When the vibration acceleration of the translucent cover 2 exceeds about $8.0 \times 10^5$ m/s$^2$, the liquid ejected onto the surface of the translucent cover 2 moves toward an area of the translucent cover 2 having a larger amount of displacement, for example, toward the center portion of the translucent cover 2. When the vibration acceleration of the translucent cover 2 further exceeds about $21.0 \times 10^5$ m/s$^2$, the sliding angle is about 90 degrees. As the vibration acceleration increases, the liquid adhering to the translucent cover 2 is atomized by the vibrations, and removed from the surface of the translucent cover 2. As described above, when the vibration acceleration exceeds about $21.0 \times 10^5$ m/s$^2$, the liquid ejected onto the surface of the translucent cover 2 may be atomized and removed. Thus, when the vibration acceleration of the translucent cover 2 is within the range of larger than about $8.0 \times 10^5$ m/s$^2$ and smaller than or equal to about $21.0 \times 10^5$ m/s$^2$ ("A1" in FIG. 5), for example, the liquid can be easily held on the surface of the translucent cover 2.

In the present preferred embodiment, when the vibration acceleration of the translucent cover 2 is larger than about $8.0 \times 10^5$ m/s$^2$ and smaller than or equal to about $21.0 \times 10^5$ m/s$^2$, for example, the amount of displacement (amplitude of vibration) of the translucent cover 2 is within the range of about 5.5 μm to about 15 μm, for example. When the amount of displacement of the translucent cover 2 falls within this range, the liquid can be easily held on the surface of the translucent cover 2.

More preferably, the vibration acceleration of the translucent cover 2 is larger than about $10.0 \times 10^5$ m/s$^2$ and smaller than or equal to about $17.0 \times 10^5$ m/s$^2$ ("A2" in FIG. 5), for example. When the sliding angle falls within the range of larger than or equal to about 50 and smaller than or equal to about 80, for example, a large amount of the liquid can be held on the surface of the translucent cover 2. Thus, the vibration acceleration is preferably larger than or equal to about $10.0 \times 10^5$ m/s$^2$, for example. When the vibration acceleration approaches about $21.0 \times 10^5$ m/s$^2$, the liquid may be atomized due to circuit instability or for other reasons. Thus, the vibration acceleration of the translucent cover 2 is preferably smaller than or equal to about $17.0 \times 10^5$ m/s$^2$, for example.

The vibration acceleration is calculated in the method described below.

A power source (E26104A from Keysight Technologies) and a function generator (AGF1022 from Tektronix, Inc.) feed signals to the piezoelectric device 42 at a resonance frequency of around 60 kHz to excite the piezoelectric device 42 to cause vibrations. Displacement of the translucent cover 2 excited by the vibrations of the piezoelectric device 42 is detected by a laser displacement meter (BX51M from Olympus Corporation), and measured by a multimeter (2110 from Keysight Technologies) and an oscilloscope (oscilloscope TBS1104 from Tektro). The vibration acceleration is calculated with a formula $\alpha=(2\pi f)^2 A$, where the vibration acceleration is denoted with α, the frequency is denoted with f, and the amplitude (amount of displacement) is denoted with A.

Figure 6:
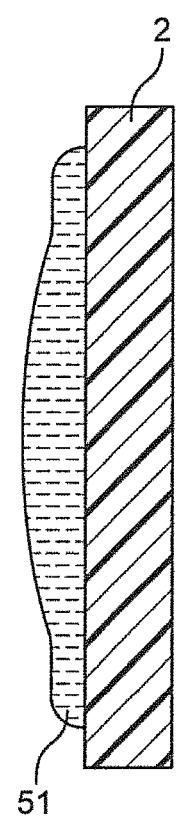
FIG. 6 is an enlarged view of a portion of the translucent cover in the vibrating device illustrated in FIG. 1.

FIG. 6 is an enlarged view of a portion of the translucent cover 2 of the vibrating device 200 illustrated in FIG. 1. When a liquid is ejected onto the translucent cover 2 (step S101), and the translucent cover 2 is caused to vibrate (step S102), a liquid 51 is held on the surface of the translucent cover 2, as illustrated in FIG. 6. In the present preferred embodiment, while the translucent cover 2 is vibrating, the translucent cover 2 has the largest amount of displacement around the center portion. The portion of the translucent cover 2 having a larger amount of displacement can hold a larger amount of the liquid 51. Thus, as illustrated in FIG. 6, the liquid at the center portion has a larger thickness.

After the liquid is held on the surface of the translucent cover 2 in step S101 and step S102, an AC voltage is applied to the second vibrating portion 5 to provide vibrations to the liquid on the surface of the translucent cover 2 (step S103). Vibrations are provided to the liquid on the surface of the translucent cover 2 to clean the surface of the translucent cover 2.

Thereafter, when the application of an AC voltage to the first vibrating portion 4 and the second vibrating portion 5 is stopped, the translucent cover 2 stops vibrating, and the liquid held on the surface of the translucent cover 2 starts flowing down.

The vibrating device 200 and the vibration control method according to Preferred Embodiment 1 provide the following advantageous effects.

The vibrating device 200 includes the translucent cover 2, the ejector 3, and the first vibrating portion 4. The first vibrating portion 4 vibrates the translucent cover 2 at a vibration acceleration of larger than about $8.0\times10^5$ m/s$^2$ and equal to or smaller than about $21.0\times10^5$ m/s$^2$, for example. The ejector 3 can eject a liquid onto the surface of the translucent cover 2, and the first vibrating portion 4 can hold the liquid on the surface of the translucent cover 2. The liquid holdable on the surface of the translucent cover 2 can efficiently clean the translucent cover of foreign matter adhering to translucent cover.

The vibrating device 200 also includes the controller 6 that controls the first vibrating portion 4 and the ejector 3, and can control vibrations of the first vibrating portion and ejection of the liquid from the ejector.

The first vibrating portion 4 includes the piezoelectric device 42, and the controller 6 controls the vibration acceleration by changing the voltage to be applied to the piezoelectric device 42. Thus, the vibrating device 200 can easily control the vibration acceleration of the translucent cover 2.

The vibrating device 200 also includes one or more second vibrating portions 5, which are controlled by the controller 6 and positioned around the translucent cover 2. The second vibrating portions 5 provide vibrations to the liquid held on the surface of the translucent cover 2 to improve the cleaning performance.

The second vibrating portions 5 have an annular shape. Vibrations can thus be uniformly provided to the liquid sprayed on the translucent cover 2. Thus, the vibrating device 200 can improve the cleaning performance.

An example where the ejector 3 includes the pump 33 has been described by way of example, but this is not the only possible example. Instead, the ejector 3 may include another device that is controllable by the controller 6 and that can provide a liquid.

The vibration control method has the same advantageous effects as the advantageous effects of the above-described vibrating device 200.

Figure 7:
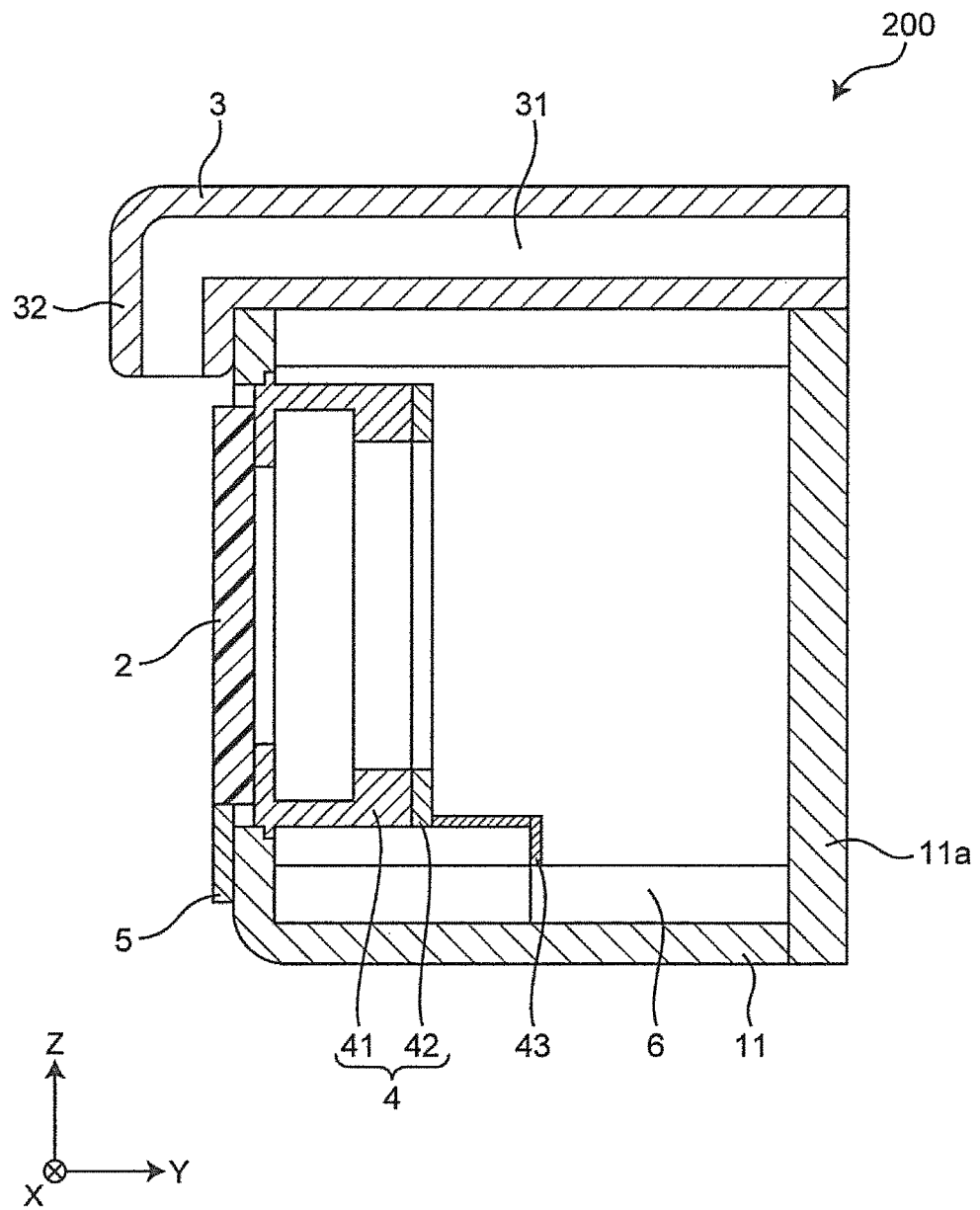
FIG. 7 is a schematic diagram of the vibrating device according to Preferred Embodiment 1 of the present invention.

In Preferred Embodiment 1, an example of the vibrating device 200 installed on the image pickup unit 100 including the image pickup portion 12 has been described by way of example. However, the image pickup portion 12 is not required. FIG. 7 is a schematic diagram of the vibrating device 200 according to Preferred Embodiment 1. As illustrated in FIG. 7, the vibrating device 200 may be used by itself.

In Preferred Embodiment 1, an example of the vibrating device 200 including the second vibrating portion 5 and the controller 6 has been described by way of example. However, the second vibrating portion 5 and the controller 6 are not required.

In Preferred Embodiment 1, an example of the translucent cover 2 with a disc shape has been described by way of example. However, the shape of the translucent cover 2 is not limited to this shape. For example, the translucent cover 2 may have a polygonal plate shape, a dome shape, or another shape.

In Preferred Embodiment 1, the vibrator 41 of the first vibrating portion 4 made of metal has been described by way of example. However, the material of the vibrator 41 is not limited to this. The vibrator 41 can be made of a material that can transmit the vibrations of the piezoelectric device 42 to the translucent cover 2, such as ceramics, for example.

In Preferred Embodiment 1, the non-limiting example of a vibration control method includes ejection of the liquid onto the surface of the translucent cover 2 with the ejector 3 (step S101), and then vibrating the translucent cover 2 with the first vibrating portion 4 (step S102). However, this is not the only possible example. For example, the order of step S101 and step S102 may be switched from each other.

Figure 8:
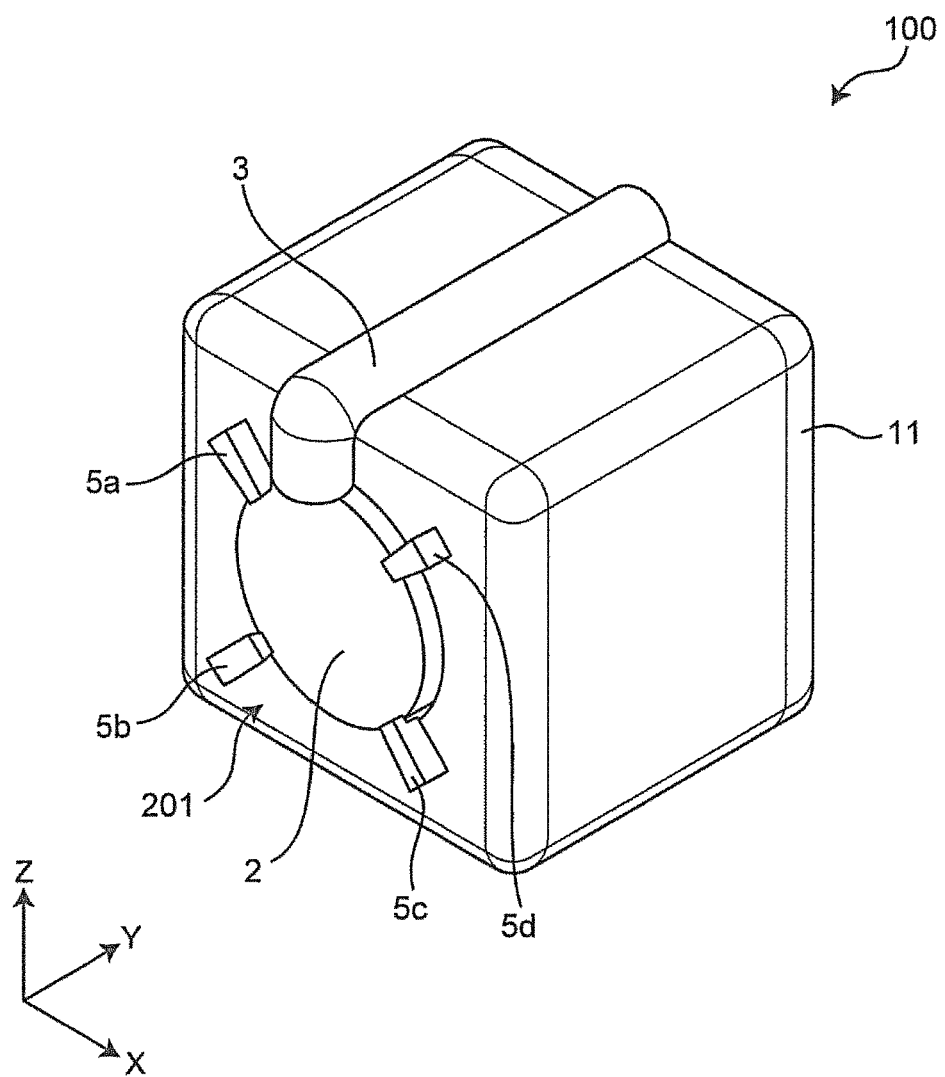
FIG. 8 is a diagram of a vibrating device according to Modified Example 1 of Preferred Embodiment 1 of the present invention.

FIG. 8 illustrates a vibrating device 201 according to Modified Example 1 of Preferred Embodiment 1. Instead of the annular second vibrating portion 5 according to Preferred Embodiment 1, the vibrating device 201 may include multiple second vibrating portions 5a to 5d positioned around the translucent cover 2. In the vibrating device 201 illustrated in FIG. 8, four second vibrating portions 5a to 5d are equidistantly positioned around the translucent cover 2. Here, instead of the four second vibrating portions 5a to 5d, for example, two or more second vibrating portions may be included. Equidistantly disposing the multiple second vibrating portions enables uniform cleaning of the entire or substantially the entire surface of the translucent cover 2.

Figure 9:
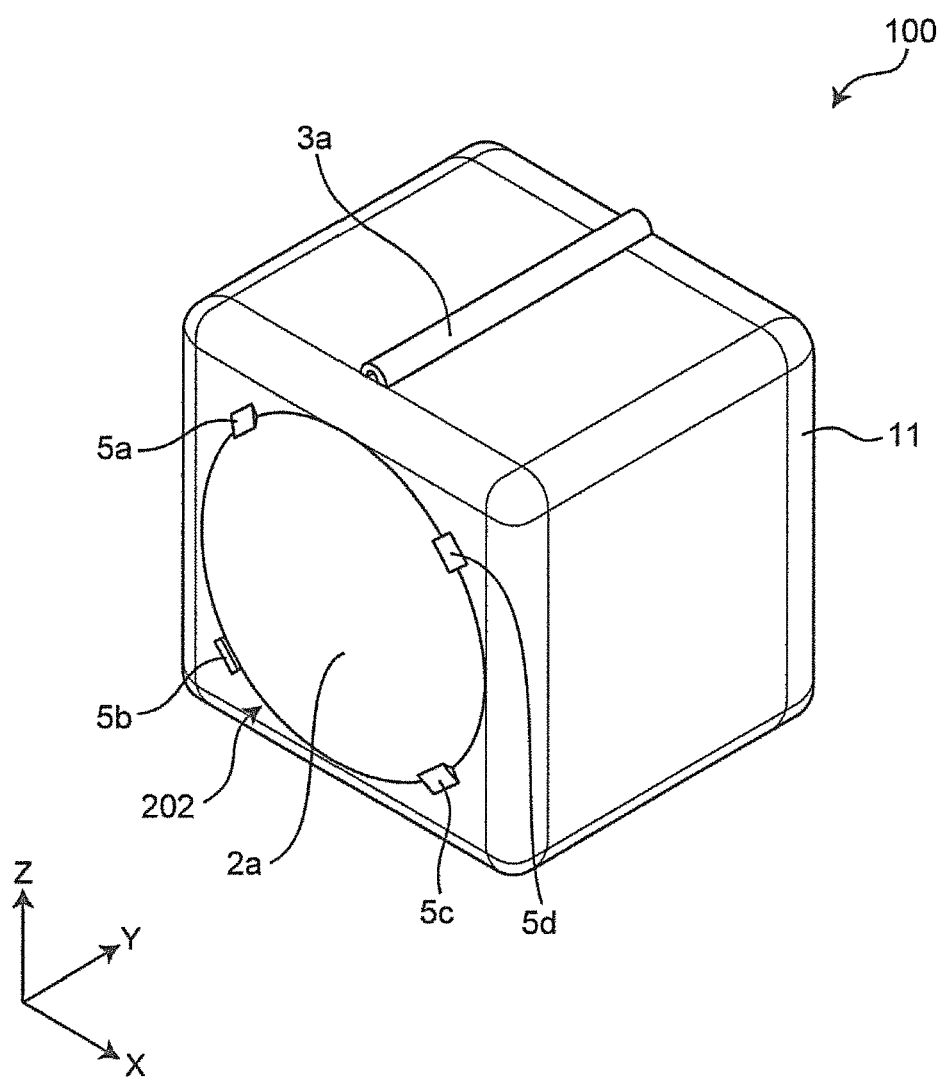
FIG. 9 is a diagram of a vibrating device according to Modified Example 2 of Preferred Embodiment 1 of the present invention.
Figure 10:
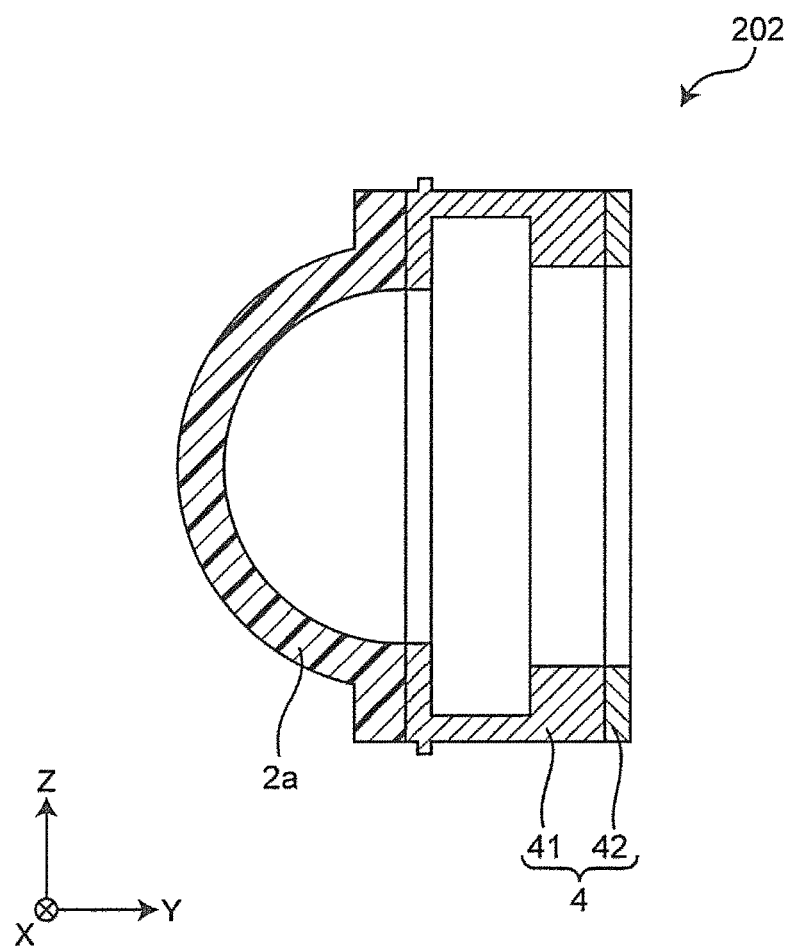
FIG. 10 is a cross-sectional view of a portion of the vibrating device illustrated in FIG. 9.

FIG. 9 illustrates a vibrating device 202 according to Modified Example 2 of Preferred Embodiment 1. FIG. 10 is a cross-sectional view of a portion of the vibrating device 202 illustrated in FIG. 9. Instead of the disc-shaped translucent cover 2 and the annular second vibrating portion 5 according to Preferred Embodiment 1, the vibrating device 202 may include a dome-shaped translucent cover 2a and four second vibrating portions 5a to 5d, as illustrated in FIGS. 9 and 10. The dome-shaped translucent cover 2a can increase the field of vision of the image pickup portion 12.

Instead of the ejector 3 according to Preferred Embodiment 1, the vibrating device 202 includes an ejector 3a with a different shape. The ejector 3a can eject the liquid in the lateral direction (Y direction).

Preferred Embodiment 2

A vibrating device according to Preferred Embodiment 2 of the present invention will be described.

Preferred Embodiment 2 will mainly be described in terms of points different from those of Preferred Embodiment 1. In Preferred Embodiment 2, the same or similar components as those in Preferred Embodiment 1 are denoted with the same reference signs. In Preferred Embodiment 2, description the same or substantially the same portions as those in Preferred Embodiment 1 will be omitted.

Preferred Embodiment 2 is different from Preferred Embodiment 1 in that it includes a water-repellent coating layer 20 on the surface of the translucent cover 2.

Figure 11:
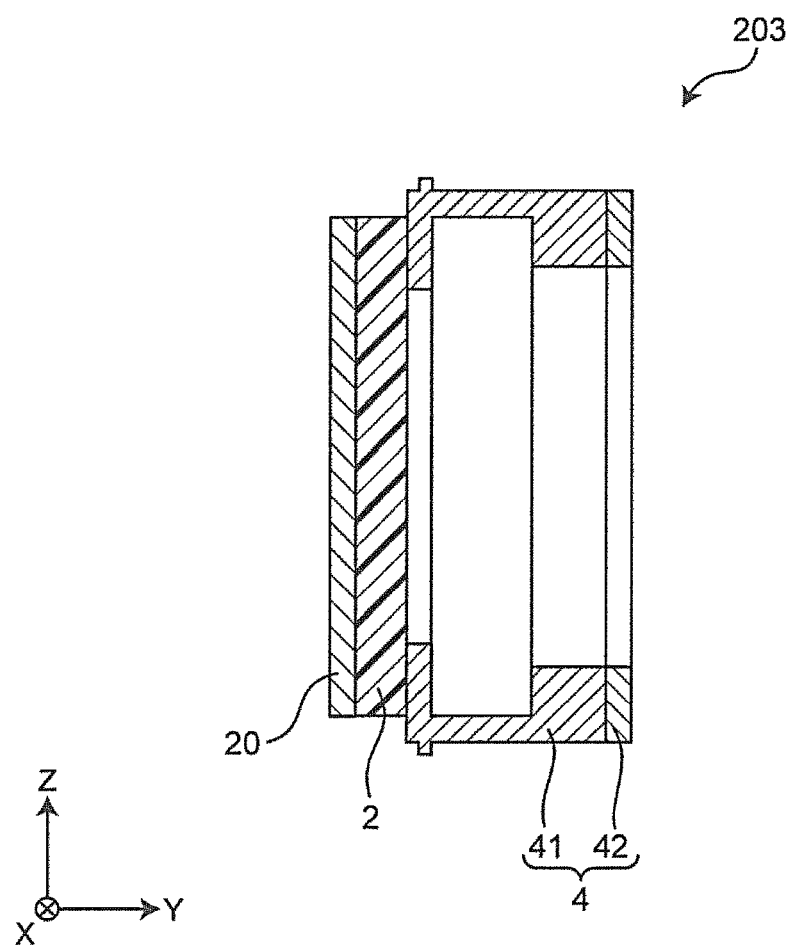
FIG. 11 is an enlarged view of a translucent cover and a first vibrating portion in a vibrating device according to Preferred Embodiment 2 of the present invention.

FIG. 11 is an enlarged view of a translucent cover 2 and a first vibrating portion 4 of a vibrating device 203 according to Preferred Embodiment 2. As illustrated in FIG. 11, the water-repellent coating layer 20 is disposed on the surface of the translucent cover 2 of the vibrating device 203.

The water-repellent coating layer 20 repels the liquid. For example, the water-repellent coating layer 20 is made of a material having a contact angle larger than the surface of the translucent cover 2. In the present preferred embodiment, the water-repellent coating layer 20 is disposed over the entire or substantially the entire surface of the translucent cover 2.

The water-repellent coating layer 20 can be formed by, for example, applying a fluorine coating material or silicone coating material to the surface of the translucent cover 2. Examples of a fluorine coating material include a material including a compound including a perfluoroalkyl group as a main component, and a material including a compound including a perfluoroalkyl group (F is substituted for H in alkyl group) as a main component. Specific examples of a fluorine coating material include fluorine-containing polymer and polytetrafluoroethylene (PTFE). Examples of a silicone coating material include silicone oil.

When, for example, the water-repellent coating layer 20 comes off or is removed, the water-repellent coating layer 20 may be coated again with the coating material ejected from the ejector 3. After the coating material is ejected onto the surface of the translucent cover 2, the first vibrating portion 4 vibrates the translucent cover 2, so that the coating material can be held on the surface of the translucent cover 2. This structure facilitates fixing of the coating material onto the surface of the translucent cover 2.

The vibrating device according to Preferred Embodiment 2 provides the following advantageous effects.

The water-repellent coating layer 20 is disposed on the surface of the translucent cover 2. The water-repellent coating layer hinders adhesion of dirt on the surface of the translucent cover 2. In addition, vibrations of the first vibrating portion 4 allow the liquid ejected from the ejector 3 to be held on the surface of the translucent cover 2. Thus, the cleaning performance can be further improved.

Preferred Embodiment 2 has described the water-repellent coating layer 20 disposed over the entire or substantially the entire surface of the translucent cover 2 by way of example, but this is not the only possible example. For example, the water-repellent coating layer 20 may be disposed on a portion of the surface of the translucent cover 2.

Preferred Embodiment 3

A vibrating device according to Preferred Embodiment 3 of the present invention will be described.

Preferred Embodiment 3 will mainly be described in terms of points different from those of Preferred embodiment 2. In Preferred Embodiment 3, the same or similar components as those in Preferred Embodiment 2 are denoted with the same reference signs. In Preferred Embodiment 3, description the same or substantially the same portions as those in Preferred Embodiment 2 will be omitted.

Figure 12:
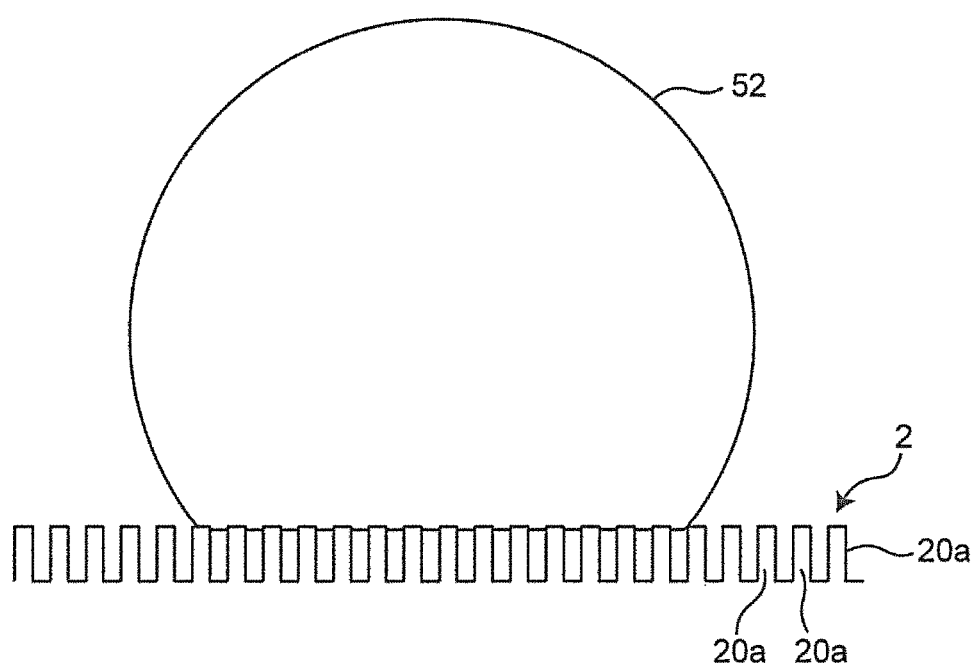
FIG. 12 is an enlarged view of a surface of a translucent cover of a vibrating device according to Preferred Embodiment 3 of the present invention.

FIG. 12 is an enlarged view of the surface of a translucent cover 2 of a vibrating device according to Preferred Embodiment 3. As illustrated in FIG. 12, Preferred Embodiment 3 is different from Preferred Embodiment 2 in that the water-repellent coating layer includes multiple protrusions 20a on the surface of the translucent cover 2.

The multiple protrusions of the water-repellent coating layer can be formed by, for example, spin-coating the surface of the translucent cover 2 with a solution containing silica nanoparticles of a particle diameter of approximately 40 nm to approximately 100 nm to cause sol-gel transformation. Alternatively, the multiple protrusions can be formed by, for example, transferring the pattern to the surface of the translucent cover 2 using a mold having fine projections and depressions on its surface.

The multiple protrusions of the water-repellent coating layer preferably have a size (for example, a diameter or a length of one side) of smaller than or equal to about 500 nm, for example.

As illustrated in FIG. 12, the water-repellent coating layer including the multiple protrusions 20a easily repels a liquid, such as a cleaning liquid. On the other hand, dirt such as oil may stray between the multiple protrusions 20a. In the present preferred embodiment, the first vibrating portion 4 vibrates the translucent cover 2 to hold the cleaning liquid, and the second vibrating portion 5 vibrates the cleaning liquid to facilitate removal of dirt between the multiple protrusions 20a. Thus, a cleaning liquid 52 can run between the multiple protrusions 20a to remove the dirt between the multiple protrusions 20a.

The vibrating device according to Preferred Embodiment 3 provides the following advantageous effects.

The water-repellent coating layer includes the multiple protrusions 20a in the translucent cover 2. The multiple protrusions 20a of a size smaller than or equal to about 500 nm, for example, can prevent adhesion of dirt to the surface of the translucent cover 2, and enable efficient removal of dirt that strays between the multiple protrusions 20a.

Preferred Embodiment 4

A vibrating device according to Preferred Embodiment 4 of the present invention will be described.

Preferred Embodiment 4 will mainly be described in terms of points different from those of Preferred Embodiment 1. In Preferred Embodiment 4, the same or similar components as those in Preferred Embodiment 1 are denoted with the same reference signs. In Preferred Embodiment 4, description the same or substantially the same portions as those in Preferred Embodiment 1 will be omitted.

Preferred Embodiment 4 is different from Preferred Embodiment 1 in that the vibrating device excludes the second vibrating portion 5. Specifically, the vibrating device according to Preferred Embodiment 4 includes a translucent cover 2, an ejector 3, a first vibrating portion 4, and a controller 6.

Figure 13:
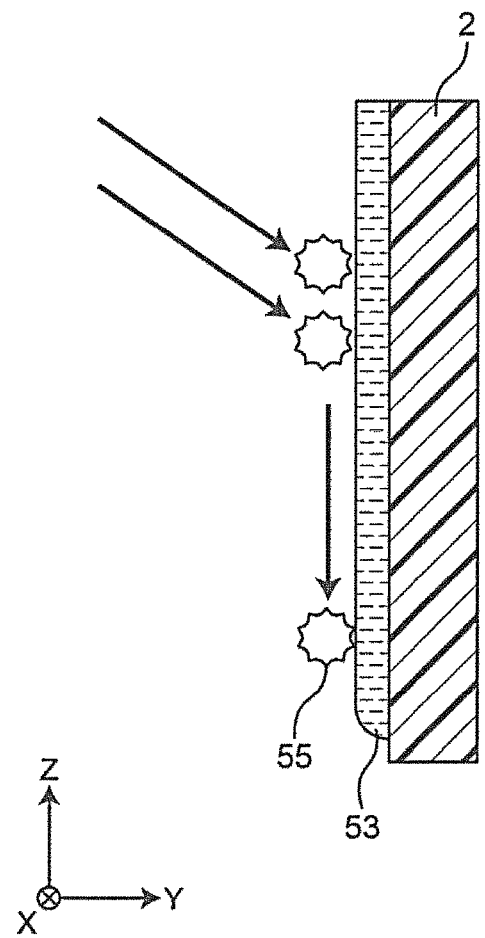
FIG. 13 is a schematic diagram of a water curtain provided by a vibrating device according to Preferred Embodiment 4 of the present invention.

FIG. 13 is a schematic diagram of a water curtain provided by the vibrating device according to Preferred Embodiment 4. As illustrated in FIG. 13, in the present preferred embodiment, a water curtain 53 can be provided by holding a liquid on the surface of the translucent cover 2. The water curtain 53 is a film-shaped liquid held on the surface of the translucent cover 2. Holding the liquid in a film shape on the surface of the translucent cover 2 can prevent adhesion of dirt 55 to the translucent cover 2.

The vibrating device according to Preferred Embodiment 4 provide the following advantageous effects.

The vibrating device includes the translucent cover 2, the ejector 3, the first vibrating portion 4, and the controller 6.

This structure can hold the liquid in a film shape on the surface of the translucent cover 2, and prevent adhesion of dirt.

An existing water curtain disadvantageously involves continuous flowing of a liquid (water) and an increase of water consumption. To reduce the consumption of water, a method for circulating water has also been studied. However, a device for water circulation has a complex structure. On the other hand, the vibrating device according to the present preferred embodiment can easily hold the liquid on the surface of the translucent cover 2. Thus, Preferred Embodiment 4 can easily provide a water curtain with a small device.

Example

The cleaning performance of the vibrating device 200 according to Preferred Embodiment 1, used as Example 1, on the translucent cover 2 was evaluated. In Example 1, the vibrating device 200 ejected a cleaning liquid onto the translucent cover 2 from the ejector 3, and then applied an AC voltage to the first vibrating portion 4 and the second vibrating portion 5 for five seconds. The translucent cover 2 received dirt 56 including oil as a main component in advance, and the degree of adhesion of dirt was compared before and after the cleaning.

Figure 14A:
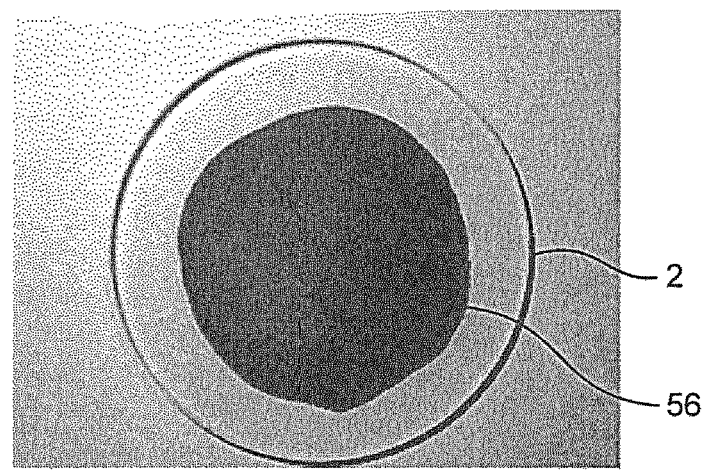
FIG. 14A is a photo of a translucent cover on which dirt adheres, before being cleaned by a vibrating device according to Example 1 of a preferred embodiment of the present invention.
Figure 14B:
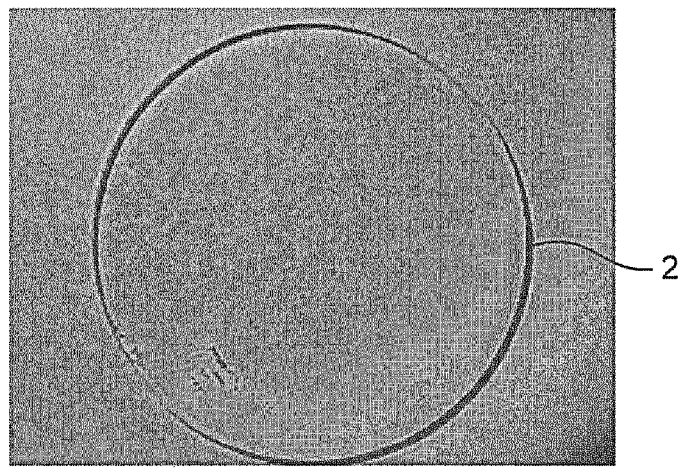
FIG. 14B is a photo of a translucent cover after cleaned by the vibrating device according to Example 1.

FIG. 14A is a photo of the translucent cover 2 receiving dirt before being cleaned by the vibrating device 200 of Example 1. FIG. 14B is a photo of the translucent cover 2 after being cleaned by the vibrating device 200 of Example 1.

As illustrated in FIG. 14B, after the vibrating device 200 of Example 1 performs cleaning for approximately five seconds, almost all of the dirt 56 adhering to the translucent cover 2 was removed.

Generally, as the second vibrating portion 5 and the cleaning liquid held on the surface of the translucent cover 2 are in contact with each other over a larger contact area, the vibrating device 200 produces higher cleaning performance. In Example 1, the second vibrating portion 5 has an annular shape to cover the surroundings of the translucent cover 2. Thus, the liquid held on the surface of the translucent cover 2 and the second vibrating portion 5 are in contact with each other over a large contact area, so that the cleaning efficiency is improved. In addition, the second vibrating portion 5 covering the surroundings of the translucent cover 2 causes standing waves. The cleaning performance is higher at the antinodes of the standing waves. Thus, the annular second vibrating portion 5 positioned around the translucent cover 2 can further improve the cleaning efficiency.

When the liquid held on the surface of the translucent cover 2 and the second vibrating portion 5 are in contact with each other over a small contact area, the cleaning performance can be improved by increasing the time for which a voltage is applied to the first vibrating portion 4 and the second vibrating portion 5.

The present invention has been described in relation to preferred embodiments with reference to the drawings. However, various modifications and/or changes are apparent for those skilled in the art. Such modifications and/or changes are to be construed as being included in the scope of the present invention defined by the scope of claims, as long as they are within the scope of the present invention.

Image pickup units, vibrating devices, and vibration control methods according to preferred embodiments of the present invention are applicable to optical sensors for outdoor use such as an onboard camera, a surveillance camera, or LiDAR, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibrating device comprising:
a translucent cover;
an ejector to eject a liquid onto a surface of the translucent cover; and
a first vibrating portion configured to vibrate the translucent cover at a vibration acceleration of larger than about $8.0\times10^5$ m/s$^2$ and equal to or smaller than about $21.0\times10^5$ m/s$^2$.

2. The vibrating device according to claim 1, further comprising a controller configured or programmed to control the first vibrating portion and the ejector.

3. The vibrating device according to claim 2, wherein
the first vibrating portion includes a piezoelectric device; and
the controller is configured or programmed to control the vibration acceleration by controlling a voltage applied to the piezoelectric device to be higher than about 15 Vp-p and equal to or lower than about 40 Vp-p.

4. The vibrating device according to claim 2, further comprising one or more second vibrating portions controlled by the controller and positioned around the translucent cover.

5. The vibrating device according to claim 4, wherein
the one or more second vibrating portions include a plurality of second vibrating portions;
the plurality of second vibrating portions are equidistantly positioned around the translucent cover.

6. The vibrating device according to claim 1, wherein a water-repellent coating layer is located on the surface of the translucent cover.

7. The vibrating device according to claim 6, wherein the water-repellent coating layer includes a plurality of protrusions on the surface of the translucent cover.

8. The vibrating device according to claim 2, wherein the controller includes a central processing unit.

9. An image pickup unit comprising:
the vibrating device according to claim 1;
an image pickup portion; and
a housing accommodating the vibrating unit and the image pickup portion therein.

10. The image pickup unit according to claim 9, wherein the housing has a tubular shape.

11. The image pickup unit according to claim 9, further comprising a controller configured or programmed to control the first vibrating portion and the ejector.

12. The image pickup unit according to claim 11, wherein
the first vibrating portion includes a piezoelectric device; and
the controller is configured or programmed to control the vibration acceleration by controlling a voltage applied to the piezoelectric device to be higher than about 15 Vp-p and equal to or lower than about 40 Vp-p.

13. The image pickup unit according to claim 11, further comprising one or more second vibrating portions controlled by the controller and positioned around the translucent cover.

14. The image pickup unit according to claim 13, wherein
the one or more second vibrating portions include a plurality of second vibrating portions; and
the plurality of second vibrating portions are equidistantly positioned around the translucent cover.

\* \* \* \* \*